United States Patent [19]
Bradford et al.

[11] Patent Number: 6,137,439
[45] Date of Patent: Oct. 24, 2000

[54] CONTINUOUS WAVE DOPPLER SYSTEM WITH SUPPRESSION OF GROUND CLUTTER

[75] Inventors: Bert L. Bradford, Damascus; Richard A. Lodwig, Gaithrsburg, both of Md.

[73] Assignee: Lockheed Martin Corporation, Bethesda, Md.

[21] Appl. No.: 09/148,988

[22] Filed: Sep. 8, 1998

[51] Int. Cl.[7] .............................. G01S 13/00; G01S 7/493; G01S 7/536

[52] U.S. Cl. ...................... 342/159; 342/104; 342/118; 342/189; 342/195; 342/196; 342/378

[58] Field of Search .............................. 342/29, 159–164, 342/189, 194–196, 351, 378–384, 417, 418, 422–424, 432, 441–445, 59, 104, 113, 115, 118, 145

[56] References Cited

U.S. PATENT DOCUMENTS

| | | |
|---|---|---|
| 3,594,794 | 7/1971 | Halpern ............................ 342/159 X |
| 3,706,989 | 12/1972 | Taylor, Jr. . |
| 3,806,924 | 4/1974 | Applebaum . |
| 4,048,637 | 9/1977 | Jacomini . |
| 4,121,209 | 10/1978 | ap Rhys . |
| 4,746,924 | 5/1988 | Lightfoot .............................. 342/453 |
| 4,876,547 | 10/1989 | Franco . |
| 5,418,534 | 5/1995 | Schmitt . |
| 5,485,157 | 1/1996 | Long . |

*Primary Examiner*—Bernarr E. Gregory
*Attorney, Agent, or Firm*—Richard L. Aitken; Venable

[57] ABSTRACT

In a continuous wave Doppler system in which a fixed transmitter transmits a continuous wave signal to be reflected by moving targets and by fixed structure, an aircraft receives the reflective signals at two spaced apart antennas. The signals reflected from moving targets are distinguished from ground clutter reflected from fixed structure by the phase difference between the Doppler signals receive by the two antennas. The signals reflected from moving targets are distinguished from the ground clutter in response to the phase difference between the Doppler signals received by the two antennas being not equal to a phase difference value determined to be the phase difference for clutter signals. The phase difference value for clutter signals is determined from a function expressing the phase difference value as a linear variation with the Doppler frequency of the signals.

13 Claims, 2 Drawing Sheets

CONTINUOUS WAVE DOPPLER SYSTEM WITH SUPPRESSION OF GROUND CLUTTER

BACKGROUND OF THE INVENTION

This invention relates to a Doppler target tracking system of the type in which fixed ground based transmitters transmit continuous wave signals to be reflected from a moving target and in which a moving platform, such as an aircraft carries a receiver to receive the reflected Doppler shifted signals and more particularly to such a system in which ground clutter is suppressed or canceled.

In Doppler target tracking systems, the received signals include signals reflected from the moving target as well as signals reflected from ground based structures. The reflection from the ground based structures is called "ground clutter", which hereinafter is referred to simply as "clutter". The present invention is directed to a continuous wave Doppler system, in which the clutter components in the Doppler signal received by the moving platform are characterized so that they can be distinguished from target signals. In Doppler systems employing an aircraft or other moving platform to receive the reflected signals, the clutter signals are Doppler shifted by the motion of the aircraft which receives the reflected signals. The clutter signals are much in excess of signals reflected from moving targets which are desired to be tracked and the Doppler shift occurs in the same region of Doppler space that the Doppler shift from the targets appears. Accordingly, to enable efficient detection and tracking of a target, the clutter signals need to be effectively distinguished from target signals.

Prior to the present invention, the problem of clutter in Doppler radar systems have been recognized and systems have been developed to eliminate the ground clutter from Doppler radar signals. These systems are for the most part designed for use with pulse type radar and for the most part are not designed for use in continuous wave type radar systems. Some systems of the prior art are intended to be applicable to all kinds of Doppler radar systems, including continuous wave systems, but these systems of the prior art would not be effective in a system in which the reflected signals are received by a moving platform such as an aircraft.

SUMMARY OF THE INVENTION

In accordance with the present invention, the aircraft which provides the moving platform to receive the reflected continuous wave signals is provided with two antennas on the side of the aircraft separated by predetermined distance d. These two antennas will each receive the reflected continuous wave signals. The clutter signals are received over a wide range of azimuth values with respect to the heading of the aircraft. The two antennas will receive identical clutter signals from each patch of ground except that the phase of the signals will differ by an amount $$\Delta\phi = (2\pi)\lambda/\sin\theta \qquad (1)$$

in which $\lambda$ is the wavelength of the continuous wave signal and $\theta$ is the azimuth direction with respect to a line perpendicular to the two antenna elements. The clutter signals received by the two antennas will also be Doppler shifted by the motion of the aircraft in the manner that is also dependent upon the azimuth, to a close approximation, in accordance with the following equation:

$$f_d = (1/\lambda)v \sin\theta \qquad (2)$$

in which $f_d$ is the Doppler shift of the received signals caused by the motion of the aircraft, v is the velocity magnitude of the aircraft and $\theta$ is the angle between perpendicular to the longitudinal axis of the aircraft and the ground structure causing the clutter signal. The angle $\theta$ in this equation is identical to the angle $\theta$ in Equation (1), but Equation (2) assumes that the aircraft velocity is along the longitudinal axis of the aircraft. Equations (1) and (2) are functions of the same argument so that they may be theoretically equated as follows:

$$\Delta\phi = (2\pi d/v)f_d \qquad (3)$$

Accordingly, as shown in Equation (3), there is a linear relationship between the Doppler shift in the clutter signal received by the aircraft and the phase difference between the signals received by the two antennas of the aircraft. Moving targets, which are reflecting Doppler signals to the receiving aircraft, will not have the same Doppler phase relationship that the ground clutter signals have.

In actual practice, the aircraft velocity vector may not be on the longitudinal axis of the aircraft and this effect as well as other errors may be expected to cause the linear relationship between frequency and phase difference to have a non-zero intercept.

In accordance with the invention, a discrete Fourier transform (DFT) or other suitable time-to-frequency transformation is carried out on the signal being received by each antenna. In the resulting Fourier series, the presence of ground clutter will be revealed by a straight line of signal points in the phase Doppler space. Noise and moving targets will be randomly distributed in this phase Doppler space. Using this scattering of signals, the phase Doppler linear relationship is computed using a linear model to fit to all phase Doppler points. The resulting function is then used to compute a clutter line defined by its slope and intercept so that all members of the line of signals corresponding to ground clutter can be distinguished from moving target signals. In this manner, ground clutter in the received signals as well as the signals received directly from the transmitter can be highly suppressed or ignored in the output of the system. Desired signals representing moving targets because of their motion will not be suppressed or ignored.

DESCRIPTION OF A PREFERRED EMBODIMENT

Figure 1:
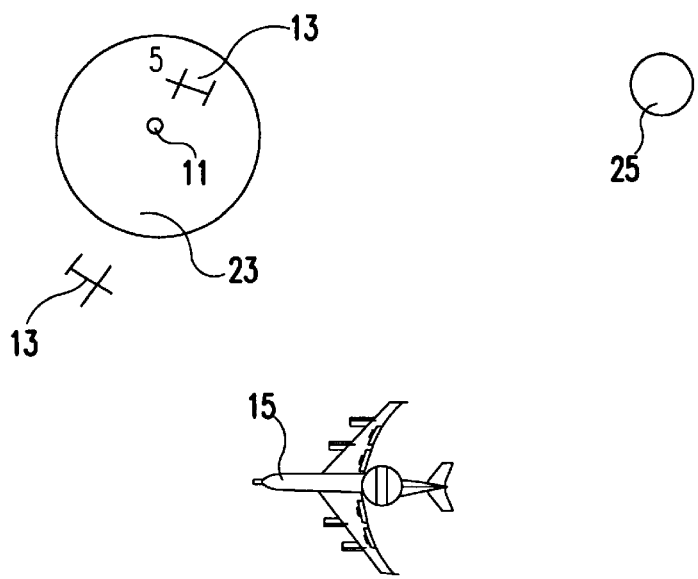
FIG. 1 illustrates a continuous wave Doppler system of the type to which the present invention is applicable.

In the system of the invention as shown in FIG. 1, continuous wave (CW) transmitters 11 transmit CW signals to be reflected from targets 13, which may be an aircraft or a missile. The CW signals are detected by antennas 19 and 21 on the aircraft 15. The antennas 19 and 21 are separated by a predetermined distance d. A computer on the aircraft 15 uses the received continuous wave signal to track the targets 13. Before the continuous wave signals are used by the computer to track a target, the components in the received continuous wave signals due to ground clutter are characterized by the system of the present invention so that the tracking system will respond only to Doppler signals reflected from moving targets to track the moving targets.

To simplify the system, the system will be described for one of its transmitters 11, it being understood that the same clutter suppression system will be employed for each of the continuous wave signals originating from each of the transmitters.

Figure 2:
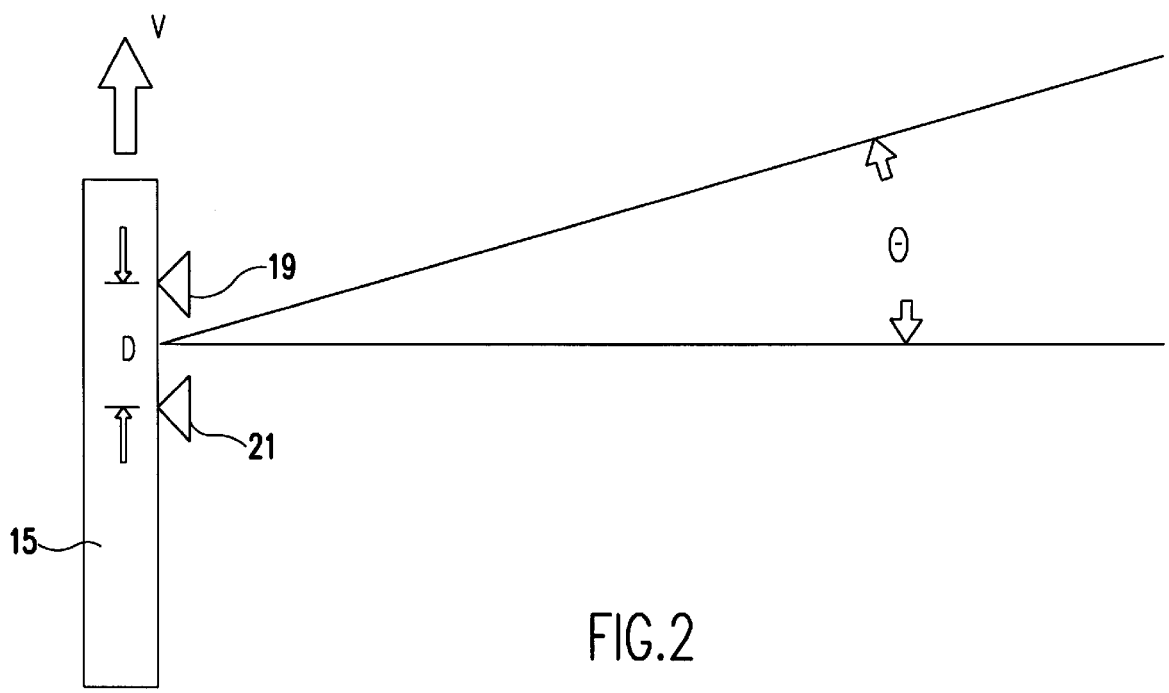
FIG. 2 schematically illustrates the antenna arrangement mounted on an aircraft to receive Doppler signals.
Figure 3:
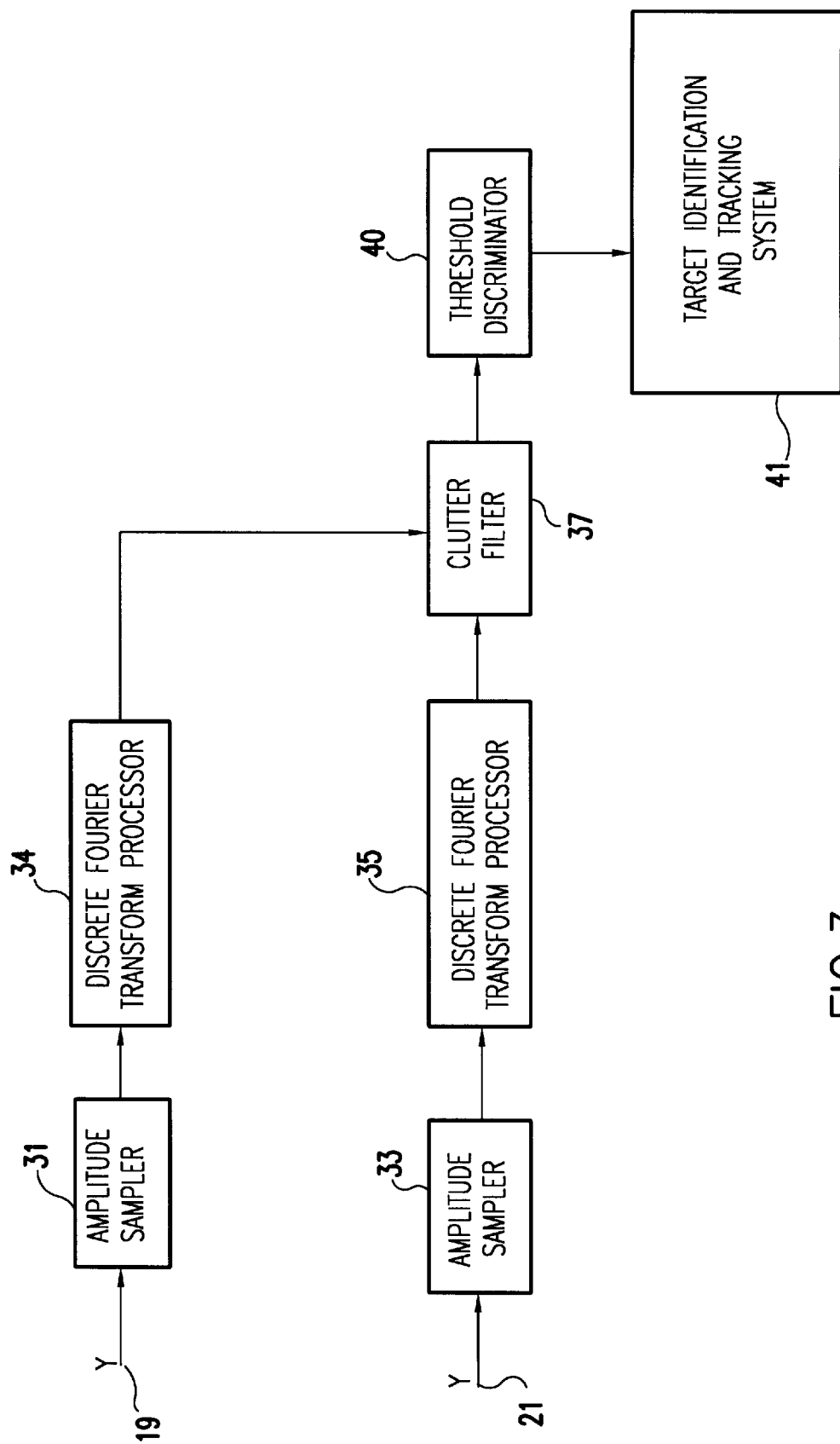
FIG. 3 is a block diagram schematically illustrating a portion of the system of the present invention.

As shown in FIG. 2, the CW signals reflected from the targets 13 are detected by at least two antennas 19 and 21 mounted on the aircraft 15 to receive signals from a direction perpendicular to the longitudinal axis of the aircraft as shown in FIG. 3. The two antennas are spaced apart by a known distance d along a line parallel to the longitudinal axis of the aircraft. Signals from the source 11, as shown in FIG. 1, in addition to being reflected from the targets 13, will also be reflected from fixed objects on the ground and be received by the antennas 19 and 21 on the aircraft. These latter signals are what as known as clutter and are distinguished from moving target signals by the system of the present invention. As shown in FIG. 1, a circular area 23 around a continuous wave source 11 will generated sufficiently strong ground clutter signals to cause a problem. In addition, signals reflected from a mountain peak 25 or tall building also cause a clutter signal which needs to be suppressed.

The system of the present invention suppresses clutter based on the observation that the phase difference between the clutter signals received at the antennas 11 and 13 varies linearly with the Doppler frequency of the received signal.

The present invention is described in connection with two spaced antennas on the aircraft. It will be understood that there may be more than two antenna elements all spaced along the longitudinal axis of the aircraft and the invention is applicable to systems involving more than two antennas. The bore sight of the antenna array on the aircraft is directed orthogonal to the longitudinal axis of the aircraft. The angle of arrival θ of a signal measured relative to the bore sight of the antenna array is considered positive toward the front of the aircraft. There is a difference in signal path length to the antennas 19 and 21 which is denoted by l. The value of l is given by:

$$l = d\cos(\pi/2 - \theta) = d\sin(\theta) \tag{4}$$

The difference in the phase angle $\Delta\phi$ corresponding to the difference in signal path length between the antennas 19 and 21 is given by the interferometer equation:

$$\Delta\phi = \phi_2 - \phi_1 \tag{5}$$
$$= 2\pi l/\lambda$$
$$= (2\pi d/\lambda)\sin(\theta)$$

in which d is the distance between the antenna elements and λ is the wavelength of the received signal. The Doppler measurement, that is the difference in the received signal, and the transmitted signal, is a function of the position and velocity of the signal source, the target reflecting the continuous wave signals and the receiver.

In the system of the present invention, the continuous wave signal source is stationary. In the following equations, the vector quantities are expressed in earth centered fixed coordinates and are illustrated in FIG. 3. In these equations I stands for the illuminator position, which is the position of the continuous wave signal source, T is the target position, R is the receiver position, $\dot{T}$ is the target velocity and $\dot{R}$ is the receiver velocity. The relative velocity $\mu$ between the illuminator and the target can be expressed by the following vector equation:

$$\mu = I - T \tag{6}$$

The relative velocity υ between the receiver and the target can be expressed by the following vector equation:

$$\upsilon = R - T \tag{7}$$

The Doppler measurement is then given by the following equations:

$$f_d = -(1/\lambda)\frac{d}{dt}(|\mu| + |\nu|) \tag{8}$$
$$= (1/\lambda)(\dot{T} \cdot \hat{\mu} + \dot{T} \cdot \hat{\nu} + \dot{T} \cdot \hat{\nu} - \dot{R} \cdot \hat{\nu})$$

in which $\hat{\upsilon} = \upsilon/|\upsilon|$ and $\hat{\mu} = \mu/|\mu|$

In the case of clutter, the received signals are reflected from fixed stationary objects and, accordingly, the target causing these signals is a stationary object. As a result, the Doppler equation simplifies to:

$$f_d = -(1/\lambda)\dot{R} \cdot \hat{\nu} \tag{9}$$
$$= (1/\lambda)|\dot{R}|\cos(\pi/2 - \theta)$$
$$= (1/\lambda)|\dot{R}|\sin(\theta)$$

In Equation (9), it is assumed that the longitudinal axis of the aircraft is aligned with velocity vector. In practice, a non-zero yaw angle ψ may be required to maintain the desired course due to wind conditions. In this case the received Doppler signal representing clutter becomes:

$$f_d = (1/\lambda)|\dot{R}|\sin(\theta + \psi) \tag{10}$$
$$= (1/\lambda)|\dot{R}|(\sin(\theta)\cos(\psi) + \cos(\theta)\sin(\psi))$$

Equation (10) can be simplified by using the fact that for angles near zero, the cosine function is essentially constant. This simplification follows from a Taylor series expansion of the cosine function about zero.

$$\cos(\psi) = 1 - O(\psi^2) \tag{11}$$

For example, if ψ is 10 degrees, then cos(ψ) has the value of 0.98. Accordingly, the following approximation can be made:

$$\cos(\psi) \approx 1.0 \tag{12}$$

In practice, the angle of arrival of the continuous wave signals on the receiver must be restricted by the design of the antenna array to within plus or minus 20 degrees of the bore sight. Thus, if θ is 20 degrees, then the cosine of θ has a value of 0.94. Thus, the approximation can be made:

$$\cos(\theta) \approx c_1 \tag{13}$$

in which we assign $c_1$, a selected constant value. If the $c_1$ is assigned value of 0.97, then cosine θ will deviate from $c_1$ by only 0.03. Thus, within these above described approximations, the clutter induced Doppler equation simplifies to:

$$f_d = (1/\lambda)|\dot{R}|(\sin(\theta) + c_1\sin(\psi)) \quad (14)$$
$$= (1/\lambda)|\dot{R}|\sin(\theta) + c_2$$

in which $c_2$ is assumed to be a small constant value. It should be noted that the assumed constant $c_2$ may also include an error in the Doppler measurement due to the carrier frequency drift. Accordingly, including the constant $c_2$ in the calculations compensates for two practical problems and leads to a statistical approach for characterization of the clutter signal.

By combining the interferometer equation (5) with the clutter induced Doppler equation (14) to eliminate the angle $\theta$, the following equation results for the phase difference between the signals received by the antennas 19 and 21:

$$\Delta\phi = (2\pi d/\lambda)(\lambda/|\dot{R}|)(f_d - c_2) \quad (15)$$
$$= (2\pi d/|\dot{R}|)f_d + c_3$$

Thus, for Doppler induced by ground clutter, the phase difference between the antenna elements can be expressed as a linear function of the Doppler frequency and the slope of this linear function is known. For convenience, the slope a and the linear function intercept b are defined as follows:

$$a = 2\pi d/|\dot{R}| \quad (16)$$
$$b = c_3 \quad (17)$$

As mentioned above, the arrival angle of the reflected continuous wave signals is restricted and typically is in the range of plus or minus 20 degrees from the antenna array bore sight. For clutter induced signals, the maximum Doppler shift corresponding to this range (ignoring $c_2$) can be expressed as follows:

$$\max f_d = (1/\lambda)|\dot{R}|\sin(20°) \quad (18)$$

For purposes of estimating the linear function intercept b, the Doppler shift is restricted to $\pm\max f_d$. In the system of the present invention, as will be explained below, the input signals on each antenna element are sampled in the time domain to produce a sequence of amplitude values at each antenna element. These values are then converted to the frequency domain by a suitable transform, such as a discrete Fourier transform (DFT). As a result of this transformation to the frequency domain, a pair of values representing amplitude and phase at each incrementally spaced frequency point within specified frequency limits are obtained. These incremental frequency points are referred to as bins. For each frequency bin within the restriction, $f_c \pm \max f_d$, the Doppler shift $f_d$ is computed and the corresponding phase difference $\Delta\phi$ between the antennas 19 and 21 are computed. This results in a set of values of $\Delta\phi_1$ through $\Delta\phi_n$, one value of $\Delta\phi$ for each frequency bin and a set of values of $f_{d1}$ through $f_{dn}$, one value of $f_d$ being computed for each frequency bin in the range $f_c \pm \max f_d$. The value x is then defined as follows:

$$x = \Delta\phi - af_d \quad (19)$$

In equation (19), the phase difference $\Delta\phi$ is in the interval $\pm\pi$ radians, whereas the expression $af_d$ is unconstrained. Accordingly, multiples of $2\pi$ are added to x so that x is also in the interval $\pm\pi$. This computation results in a series of values of $x_1$ through $x_n$, one for each frequency bin in the range of $f_c \pm \max f_d$. A measurement model for the clutter line on intercept b is then defined as follows:

$$x = b + \upsilon \quad (20)$$

in which $\upsilon$ is assumed to be Gaussion noise. The set of all the measurements of the clutter line intercept b according to Equation (20) may be expressed in matrix form as the following overdetermined liner system:

$$\begin{bmatrix} x_1 \\ \vdots \\ x_m \end{bmatrix} = \begin{bmatrix} 1 \\ \vdots \\ 1 \end{bmatrix} b + \begin{bmatrix} \upsilon_1 \\ \vdots \\ \upsilon_m \end{bmatrix} \quad (21)$$

The minimum unbiased estimator of the clutter line on intercept b is the sample mean expressed as follows:

$$\hat{b} = (1/m) \sum_{i=1}^{m} x_i \quad (22)$$

The clutter line residual r is then defined as follows:

$$r = \Delta\phi - af_d - \hat{b} \quad (23)$$

In Equation (23), the phase difference $\Delta\phi$ is in the interval plus or minus $\pi$ whereas the expression $af_d + \hat{b}$ is unconstrained. Consequently, multiples of $2\pi$ are added to the residual r so that it is also in the interval plus or minus $\pi$. The standard deviation $\sigma$ for all the clutter line residuals is then computed.

With the knowledge of the clutter line slope and the cutter line intercept, a clutter filter is applied to the frequency domain output of the discrete Fourier transform of the output signal from the antenna element 21. A frequency response of the clutter filter is described as follows:

$$H(f) = \exp(-j(\phi_a(f) + a(f - f_c) + \hat{b})) \quad (24)$$

In Equation (24), f is a frequency at given frequency bin, $\phi_a(f)$ represents the phase component of the corresponding signal at antenna 19 at each incremental frequency f and $f_c$ is the carrier frequency. By applying this frequency response to the frequency domain output of the discrete Fourier transform, the discrete Fourier transform output is multiplied by the expression of Equation (24) wherein the exponent of the expression of Equation (24) is added to the phase component of the frequency domain representation of the output from the antenna 21. Since for clutter signals, the phase component $\phi_b(f)$ of the output from antenna 21 is equal to $\phi_a(f) + (a)(f - f_c) + b$, the filter operation reduces the phase components in $\phi_b(f)$ to zero for clutter signals.

Thus, as a result of applying the clutter filter to the output from the discrete Fourier transform of the signal from the antenna 21, a resulting signal will be produced which for clutter induced signals will have an amplitude component but will have a zero phase component. On the other hand, Doppler signals which are received from moving targets will have phase components which are not zero and, accordingly, by looking at the phase component at each frequency bin, after the clutter filter function is applied to the signal, the Doppler signals caused by moving targets can be distinguished from clutter. In accordance with the invention, for frequencies with the restriction $f_c \pm f_d$, there are two criteria applied to the output of the clutter filter for a signal to be detected and recognized as a signal from a moving target. First, the signal to noise ratio of the signal value at a given frequency bin must exceed a threshold value which is typically 10 decibels. Secondly, the absolute value of the phase from a given frequency bin must exceed nu wherein n is a constant which is selected depending on the target of interest. If the target is an aircraft with a speed of 200 meters a second or greater, then it is not difficult to differentiate the target from clutter and an appropriate value of n is 3. On the other hand, if the target is a ballistic missile and the Doppler signal reflected from the target is being received shortly after launch wherein the target will have a lower speed, then it is more difficult to differentiate this target from clutter and a smaller value of n is needed.

The above described processes are carried out by software in a computer carried by the aircraft 13. A source code listing of the computer program for processing the output signal of the discrete Fourier transform is attached hereto as an Appendix. The source code listing is in C.

In the schematic illustration of the system shown in FIG. 3, the output signals detected from each of the antennas 19 and 21 are sampled by amplitude samplers 31 and 33, respectively. The amplitude sampled signals outputted by the amplitude samplers 31 and 33 are applied to discrete Fourier transform processors 34 and 35, respectively. The frequency domain output of the discrete Fourier transform processor 35 is applied to a clutter filter 37 in which the output signal of the discrete Fourier transform processor 35 is multiplied by the expression of Equation (24) above. To carry out this multiplication, the clutter filter receives the output signal from the processor 33 so that the phase values of this signal plus a value $a(f-f_c)+b$ designed to be equal to the phase difference between the two antennas for clutter components are subtracted from the phase value components of the output of the DFT processor 35. As a result, the signal output of the clutter filter will have zero phase values for clutter corresponding to reflections from fixed reflecting structure. The output from the clutter filter is then applied to a threshold discriminator 40 which determines which received signals have an amplitude above a selected signal-to-noise ratio and those which have phase values which exceed nσ. The signals which pass this criteria are then used by the continuous wave Doppler signal target identification and tracking system 41 to track moving targets. The target identification and tracking system 41 may be the same or similar to that disclosed in U.S. Pat. No. 5,525,995 to Benner issued Jun. 11, 1996 and entitled "Doppler Detection System for Determining Initial Position of a Maneuvering Target". The tracking system is also disclosed in copending application Ser. No. 08/917,704 by Bert L. Bradford and filed Aug. 26, 1997 and entitled "Launch Position Estimation by Coordinate Decoupling and Doppler Measuring System". The above patent to Benner and the copending application of Bert L. Bradford are incorporated herein by reference.

As described above, the system of the present invention enables a Doppler signal tracking system to eeffectively distinguish moving target signals from ground clutter and thus enable the system to more accurately and precisely track moving targets. In the system as described above, the ground clutter signals are uniquely characterized by applying the signals to a clutter filter which reduces the phase component of the clutter signals to zero and leaving the amplitude components of these clutter signals unchanged. The zero phase components of the clutter signals enables these signals to be identified and excluded from the target tracking process. The clutter filter leaves the amplitude of the signals unchanged and, accordingly, those signals which correspond to slow moving targets will not have reduced amplitudes. Thus, the system of the present invention is better able to discriminate between slow moving targets and ground clutter.

In concept, the present invention operates to distinguish moving target signals from clutter signals by not responding to or eliminating those signals which have a phase difference corresponding to the clutter line. Another way of accomplishing this function would be to shift the phase of the output signal from one of the antennas by the amount of the clutter phase shift between the two antennas and then adding or subtracting the two signals from one another. In the case of signals in the frequency domain as provided by the discrete Fourier transform processors wherein each component has an amplitude component and a phase component, the addition or subtraction would be performed vectorially on the complex values represented at each discrete frequency bin. Another way of discriminating the moving target signals from the clutter signals would be to compare the phase of the two signals at each frequency bin and those signals which had a phase difference equal to the phase difference represented by the clutter line would be canceled or otherwise ignored by the identification of the tracking system.

The specific embodiment of the invention is in a continuous wave radar system. It will be understood that the invention could be readily adapted to pulse radar systems.

These and other modifications of the above-described system may be made without departing from the spirit and scope of the invention which is defined in the appended claims.

What is claimed is:

1. A Doppler signal system comprising at least one fixed transmitter, a moving platform having first and second antennas mounted thereon and spaced apart from each other on said platform to receive signals transmitted from said transmitter and reflected from moving targets and reflected from fixed structure, and a discriminator operable to distinguish target signals reflected from moving targets from clutter signals in response to the phase difference between Doppler signals received by said first and second antennas being not substantially equal to a phase difference value determined to be the phase difference for clutter signals, said phase difference value for clutter signals being determined from a predetermined function expressing said phase difference value as a linear variation with the Doppler frequency of said signals.

2. A system as recited in claim 1, wherein said predetermined linear variation has a slope of $2\pi d/v$, in which d is the distance between the antennas and v is the speed of said platform.

3. A system as recited in claim 2 in which said platform is an aircraft and said antennas are in fixed positions spaced along an axis parallel to the longitudinal axis of said aircraft.

4. A system as recited in claim 2 further comprising means to acquire amplitude samples of the Doppler signals received on each antenna, means to transform said amplitude samples into the frequency domain to provide incremental frequency samples wherein each frequency sample is represented by an amplitude component and a phase component, and wherein said discriminator subtracts phase components derived from one of said antennas from the corresponding phase components derived from the other one of said antennas plus or minus a phase difference value determined to be the phase difference between clutter signals received by said antennas whereby the frequency domain data obtained from clutter signals will have substantially 0 phase components.

5. A system as recited in claim 4 further comprising target tracking means to track moving targets in response to output signals from said discriminator which have amplitude and phase components exceeding pre-selected threshold values.

6. A Doppler signal system as recited in claim 1 wherein said antennas are spaced along an axis parallel to the direction in which said platform is designed to move, and wherein said discriminator distinguishes clutter signals in response to said phase difference being equal to $(2\pi d/v)f_d+b$ in which d is the distance between said antennas, v is the speed of the platform, $f_d$ is the Doppler frequency and b is an empirical constant.

7. A system as recited in claim 1 further comprising target tracking means to track targets in response to signals distinguished from clutter signals by said discriminator as being reflected from moving targets.

8. A system as recited in claim 1, wherein said transmitted signals are continuous wave signals.

9. A method of distinguishing Doppler signals reflected from moving targets from clutter signals comprising receiving reflected signals with two antennas on a platform spaced apart along an axis generally parallel to the motion of said platform, and determining that signals are reflected from moving targets in response to the phase difference between the signals received by said antennas being not substantially equal to a phase difference value determined to be the difference for clutter signals, the phase difference value for clutter signals being determined from a predetermined function expressing said phase difference value as a linear variation with the Doppler frequency of said signals.

10. A method as recited in claim 9, wherein the phase difference value is $(2\pi d/v)f_d+b$ in which d is the distance between said antennas, v is the speed of said platform, $f_d$ is the Doppler frequency, and b is an empirical constant.

11. A method as recited in claim 9, wherein said method includes taking amplitude samples of the signals received at each one of said antennas, transforming said amplitude samples to the frequency domain, applying the frequency domain signals derived from one of said antennas to a clutter filter wherein said phase difference value is subtracted from the phase components of the frequency domain signal derived from said one of said antennas, whereby clutter signals in said frequency domain are characterized by having zero phase components.

12. A method as recited in claim 11, further comprising tracking a target in response to those filtered signals which have phase components greater than a predetermined value.

13. A method as recited in claim 9, further comprising tracking a target in response to those signals which are distinguished from other signals as signals reflected from a moving target.

* * * * *